Patented Jan. 29, 1946

2,393,798

UNITED STATES PATENT OFFICE 2,393,798

PAINT AND VARNISH REMOVERS

John D. Morgan, South Orange, and Russell E. Lowe, East Orange, N. J., assignors to Cities Service Oil Company, New York, N. Y., a corporation of Pennsylvania No Drawing. Application April 15, 1942, Serial No. 439,088

2 Claims. (Cl. 252—118)

This invention relates to paint and varnish removers. More particularly the invention relates to paste type of paint and varnish removers which evaporate or dry quite slowly and thus facilitate the removal of varnish or paint without several applications of the solvent.

The paints or coating materials which are used at the present time for coating vehicles, such as automobiles, aeroplanes and trucks, are not all air-drying paints or varnishes having a drying-oil base. Many new types of varnishes, paints and lacquers are being used which have a resin or resin-type base and they are used for both air-drying and baked varnishes. It often requires several applications of a good paint and varnish remover to dissolve or loosen these resin-type varnishes, as well as the different kinds of drying-oil paints and varnishes. The repeated application of the remover is needed because these varnish removers are quite volatile and often varnish which they dissolve dries or hardens before it can be removed. For this reason a comparatively small area can be treated at a time to permit the loosened paint or varnish to be removed before it hardens.

The primary object of the present invention is to provide a paint and varnish remover in a paste form which has high solvent properties and holds dissolved or loosened varnish in a moist condition for a long period to facilitate its removal from the coated surface.

It is very advantageous when removing paint and varnish to use cheaper solvents in flushing the paint and varnish and remover from the coated surface. With some kinds of surfaces water is a desirable solvent for washing off the dissolved paint and varnish. With other surfaces moisture is very undesirable so that volatile oils such as naphtha, gasoline or turpentine, are commonly used for washing or flushing the surface. If the remover is soluble in both water and a volatile solvent then comparatively large surfaces may be treated with the remover and after the paint and/or varnish is dissolved or loosened, it may be flushed off the surface with water or volatile oil.

Accordingly another object of the invention is to provide a paint and varnish remover which evaporates slowly and which is soluble in water as well as volatile solvent oils.

With these and other objects and features in view the invention consists in the improved varnish and paint remover hereinafter described and particularly defined in the claims in which the proportions are in parts by volume.

One paint and varnish remover involving a preferred form of the invention may be made up as follows:

30 parts of nitropropane are mixed with 10 parts of oleic acid and 4.3 parts of triethanolamine. After these constituents are thoroughly mixed and dissolved in each other, 30 parts of water are blended into the materials to form a paste type gel or soap. This gel or soap may advantageously be put through a homogenizer in order to get thorough mixing and blending of the products.

A paint and varnish remover in accordance with another form of the invention may be made as follows:

15 parts of nitropropane may be mixed with 15 parts of normal methylamyl ketone, 10 parts of oleic acid, 4.3 parts of triethanolamine, and 2 parts of pine oil. These materials are mutually soluble and may be thoroughly mixed to make a homogeneous gel containing the nitropropane and methyl ethyl ketone. 30 parts of water are then added to reduce the mixture to a thin paste gel consistency. The entire mixture may advantageously be forced through a homogenizer to get a homogeneous gel.

In these compounds the oleic acid and triethanolamine react to form a triethanolamine oleate or soap. This soap is soluble in, or blends uniformly with, nitropropane and the methyl-amyl ketone. The water is soluble in this gel material and acts to effectively form a thin paste or gel.

In place of the normal nitropropane other normal alkyl nitro-compounds may be used, such as nitrobutane or nitropentane.

In place of the triethanolamine, monoethanolamine or diethanolamine may be used in forming the soap gel. Triethanolamine, however, is very effective in providing a paste gel.

The dialkyl ketones, such as the methyl-amyl ketone, the methyl-ethyl ketone, the methyl-butyl ketone, are very active solvents for the purpose of dissolving paint and varnish films. The ketones act together with the nitro-paraffins to form the solvent base.

Pine oil may be used in this composition because it volatilizes slowly and thus tends to retard the volatilization of the paint remover paste. Furthermore the pine oil is quite effective in modifying the odor of the material to make it less offensive to the workmen who are using it.

The normal alkyl nitro-compounds are very effective solvents. It has been found, however, that the chlorides are effective solvents for removing paints and varnishes. For example trichlorethylene, dichlorethylene, orthodichlorbenzene are effective solvents and may be used in the above-mentioned formulas in place of the nitroparaffin compounds.

The preferred form of the invention having been thus described, what is claimed as new is:

1. A paint and varnish remover comprising, the reaction products of the following mixture:

| | Parts by volume |
|---|---|
| Nitropropane | 15 |
| Normal methyl-amyl ketone | 15 |
| Oleic acid | 10 |
| Triethanolamine | 4.3 |
| Pine oil | 2 |
| Water | 30 |

2. A paint and varnish remover comprising a water emulsion of about 4.3 parts by volume of an ethanolamine, about 10 parts by volume of oleic acid, about 15 parts by volume of nitropropane, about 15 parts by volume of methyl-amyl ketone, and about 2 parts by volume of pine oil, said emulsion being in paste form.

JOHN D. MORGAN.
RUSSELL E. LOWE.